United States Patent
Yoon et al.

(10) Patent No.: US 11,113,323 B2
(45) Date of Patent: Sep. 7, 2021

(54) ANSWER SELECTION USING A COMPARE-AGGREGATE MODEL WITH LANGUAGE MODEL AND CONDENSED SIMILARITY INFORMATION FROM LATENT CLUSTERING

(71) Applicant: ADOBE INC., San Jose, CA (US)

(72) Inventors: Seung-hyun Yoon, Seoul (KR); Franck Dernoncourt, Sunnyvale, CA (US); Trung Huu Bui, San Jose, CA (US); Doo Soon Kim, San Jose, CA (US); Carl Iwan Dockhorn, San Jose, CA (US); Yu Gong, San Jose, CA (US)

(73) Assignee: Adobe Inc., San Jose, CA (US)

( * ) Notice: Subject to any disclaimer, the term of this patent is extended or adjusted under 35 U.S.C. 154(b) by 223 days.

(21) Appl. No.: 16/420,764

(22) Filed: May 23, 2019

(65) Prior Publication Data

US 2020/0372025 A1    Nov. 26, 2020

(51) Int. Cl.
*G06F 7/00* (2006.01)
*G06F 16/332* (2019.01)
*G06N 20/00* (2019.01)
*G06F 16/33* (2019.01)

(52) U.S. Cl.
CPC ...... *G06F 16/3329* (2019.01); *G06F 16/3347* (2019.01); *G06N 20/00* (2019.01)

(58) Field of Classification Search
CPC .. G06F 16/3329; G06F 16/3347; G06N 20/00
USPC ................................................ 707/600–899
See application file for complete search history.

(56) References Cited

PUBLICATIONS

Yoon, S., Shin, J., & Jung, K. (2017). Learning to rank question-answer pairs using hierarchical recurrent encoder with latent topic clustering. arXiv preprint arXiv:1710.03430.

Bian, W., Li, S., Yang, Z., Chen, G., & Lin, Z. (Nov. 2017). A compare-aggregate model with dynamic-clip attention for answer selection. In Proceedings of the 2017 ACM on Conference on Information and Knowledge Management (pp. 1987-1990). ACM. Abstract Only.

Kim, Y. (2014). Convolutional neural networks for sentence classification. arXiv preprint arXiv:1408.5882.

(Continued)

*Primary Examiner* — Isaac M Woo
(74) *Attorney, Agent, or Firm* — Shook, Hardy & Bacon L.L.P.

(57) ABSTRACT

Embodiments of the present invention provide systems, methods, and computer storage media for techniques for identifying textual similarity and performing answer selection. A textual-similarity computing model can use a pre-trained language model to generate vector representations of a question and a candidate answer from a target corpus. The target corpus can be clustered into latent topics (or other latent groupings), and probabilities of a question or candidate answer being in each of the latent topics can be calculated and condensed (e.g., downsampled) to improve performance and focus on the most relevant topics. The condensed probabilities can be aggregated and combined with a downstream vector representation of the question (or answer) so the model can use focused topical and other categorical information as auxiliary information in a similarity computation. In training, transfer learning may be applied from a large-scale corpus, and the conventional list-wise approach can be replaced with point-wise learning.

20 Claims, 6 Drawing Sheets

(56) References Cited

PUBLICATIONS

Wang, S., & Jiang, J. (2016). A compare-aggregate model for matching text sequences. arXiv preprint arXiv:1611.01747.

Radford, A., Narasimhan, K., Salimans, T., & Sutskever, I. (2018). Improving language understanding by generative ore-training. URL https://s3-us-west-2.amazonaws.com/openai-assets/research-covers/languageunsupervised/language understanding paper. pdf.

Peters, M. E., Neumann, M., Iyyer, M., Gardner, M., Clark, C., Lee, K., & Zettlemoyer, L. (2018). Deep contextualized word representations. arXiv preprint arXiv:1802.05365.

Devlin, J., Chang, M. W., Lee, K., & Toutanova, K. (2018). Bert: Pre-training of deep bidirectional transformers for language understanding. arXiv preprint arXiv:1810.04805.

Yang, Y., Yih, W. T., & Meek, C. (2015). Wikiqa: A challenge dataset for open-domain question answering. In Proceedings of the 2015 Conference on Empirical Methods in Natural Language Processing (pp. 2013-2018).

Wang, M., Smith, N. A., & Mitamura, T. (2007). What is the Jeopardy model? A quasi-synchronous grammar for QA. In Proceedings of the 2007 Joint Conference on Empirical Methods in Natural Language Processing and Computational Natural Language Learning (EMNLP-CoNLL).

Wang, A., Singh, A., Michael, J., Hill, F., Levy, O., & Bowman, S. R. (2018). Glue: A multi-task benchmark and analysis platform for natural language understanding. arXiv preprint arXiv:1804.07461.

Shen, G., Yang, Y., & Deng, Z. H. (Sep. 2017). Inter-weighted alignment network for sentence pair modeling. In Proceedings of the 2017 Conference on Empirical Methods in Natural Language Processing (pp. 1179-1189).

Rajpurkar, P., Zhang, J., Lopyrev, K., & Liang, P. (2016). Squad: 100,000+ questions for machine comprehension of text. arXiv preprint arXiv:1606.05250.

Glorot, X., & Bengio, Y. (Mar. 2010). Understanding the difficulty of training deep feedforward neural networks. In Proceedings of the thirteenth international conference on artificial intelligence and statistics (pp. 249-256).

Kingma, D. P., & Ba, J. (2014). Adam: A method for stochastic optimization. arXiv preprint arXiv:1412.6980.

Tran, Q. H., Lai, T., Haffari, G., Zukerman, I., Bui, T., & Bui, H. (Jun. 2018). The context-dependent additive recurrent neural net. In Proceedings of the 2018 Conference of the North American Chapter of the Association for Computational Linguistics: Human Language Technologies, vol. 1 (Long Papers) (pp. 1274-1283).

Tay, Y., Tuan, L. A., & Hui, S. C. (2018). Multi-cast attention networks for retrieval-based question answering and response prediction. arXiv preprint arXiv:1806.00778.

Madabushi, H. T., Lee, M., & Barnden, J. (Aug. 2018). Integrating question classification and deep learning for improved answer selection. In Proceedings of the 27th International Conference on Computational Linguistics (pp. 3283-3294).

_US 11,113,323 B2_

ANSWER SELECTION USING A COMPARE-AGGREGATE MODEL WITH LANGUAGE MODEL AND CONDENSED SIMILARITY INFORMATION FROM LATENT CLUSTERING

BACKGROUND

Automatic answer selection is an increasing common artificial intelligence task. Given a natural language question and a natural language target corpus such as a document, the question answering task is to select a correct answer from a set of candidate answers in the target corpus. Question answering systems can perform answer selection by identifying the most relevant part (e.g., a sentence or a paragraph) in a textual resource, given a user query. To accomplish this, some conventional question answering systems compute a measure of similarity between the query and a set of candidate answers in the target corpus, and use the most similar candidate answer to answer the query. More generally, learning to compute a measure of similarity between units of textual information is a core technique in many systems that select text to present to users.

SUMMARY

Embodiments of the present invention are directed to techniques for identifying textual similarity and performing answer selection using a pre-trained language model, condensed similarity information from latent clustering of a target corpus, transfer learning and/or point-wise learning. In some embodiments, a textual-similarity computing model can use a pre-trained language model to generate vector representations of a question and an answer. In order to enhance a textual comparison between a question and a candidate answer, latent clustering can be performed to compute topical or other categorical information from a target corpus, and that information can be used in computing textual similarity. More specifically, the target corpus can be clustered into a designated number of latent topics or other latent groupings. The topics and other groupings are considered latent because they are assumed to exist. Probabilities of a question or answer being in each of the latent topics and other latent groupings can be calculated and condensed (e.g., downsampled) to improve performance and focus on the most relevant topics. The condensed probabilities can be aggregated and combined with a downstream vector representation of the question (or answer) in the textual-similarity computing model. As such, the model can use focused topical and other categorical information as auxiliary information in a similarity computation. In training, transfer learning may be applied from a large-scale corpus, and the conventional list-wise approach can be replaced with point-wise learning. As such, the resulting textual-similarity computing model can perform answer selection from a target corpus with improved accuracy over prior techniques.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present invention is described in detail below with reference to the attached drawing figures, wherein.

DETAILED DESCRIPTION

Overview

Figure 1:
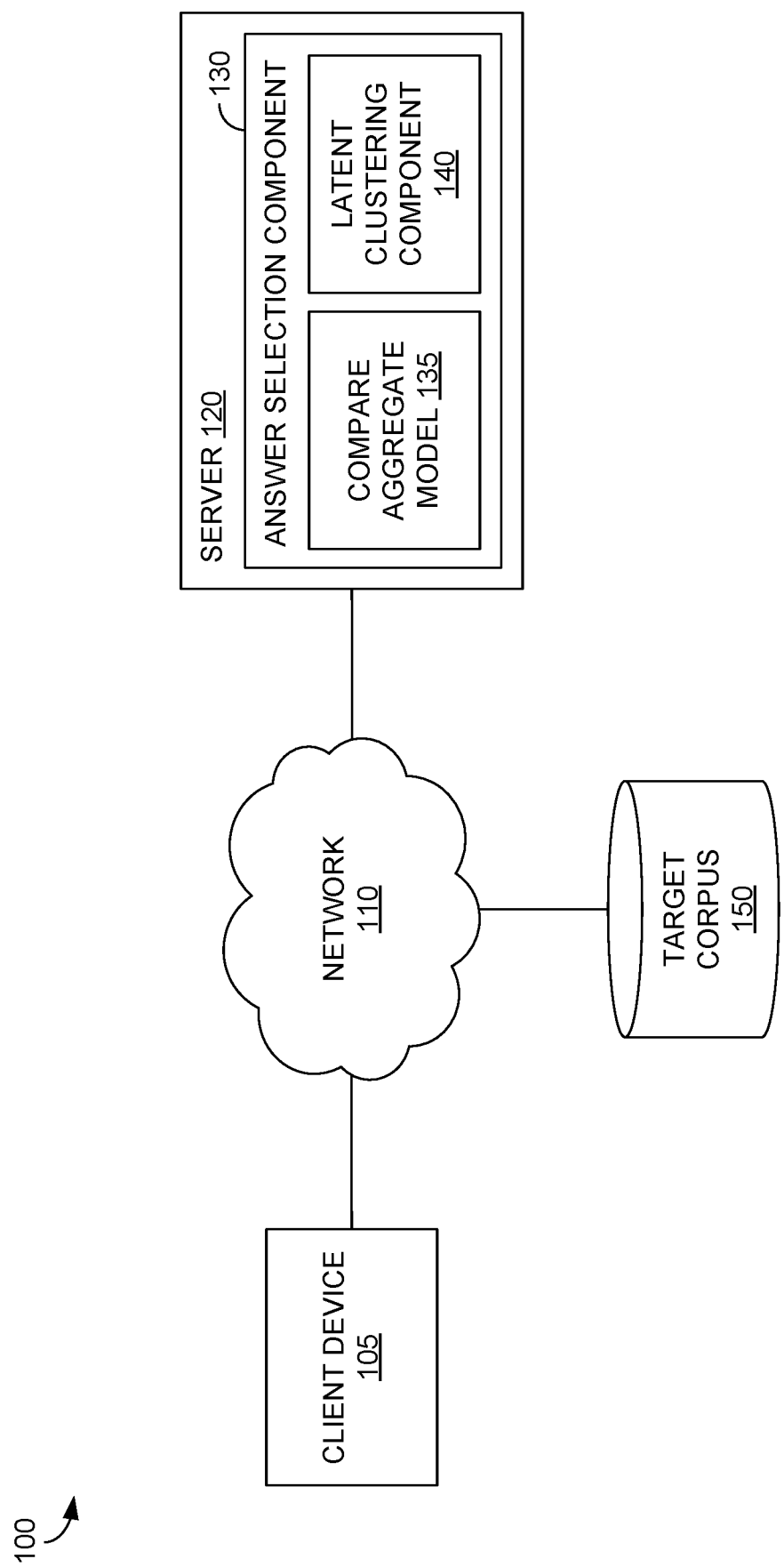
FIG. 1 is a block diagram of an example computing system for automatic answer selection, in accordance with certain embodiments.

Some existing techniques for automatic answer selection use a neural network to identify an appropriate answer to a particular question. However, conventional techniques suffer from various drawbacks. For example, some conventional approaches seek to train dedicated algorithms to perform on a particular target corpus, often resulting in over-fitting to the given target corpus, capturing noise of the data. Such over-fitting can negatively impact accuracy. Furthermore, conventional techniques that compute similarity between units of textual information often require an amount of training data that is infeasible to collect. The lack of adequate training data can result in poor performance. For these and other reasons, researchers often seek to identify ways to improve prediction accuracy.

One prior technique for automatic answer selection uses a "compare-aggregate model" to estimate a matching score between question and answer pairs. More specifically, this conventional compare-aggregate model estimates a matching score $f(y|Q,A)$, where $Q=\{q_1, \ldots, q_n\}$, $A=\{a_1, \ldots, a_n\}$, and y represent the question, answer, and label, respectively. The label may be a binary label indicting whether a particular question and candidate answer are correctly paired. The conventional compare-aggregate model consists of four parts: a context representation, attention, comparison, and aggregation. The attention mechanism essentially aligns and translates the context representation. The comparison matches words in the question and answer, and the aggregation calculates a matching score for the question and answer pair. The conventional compare-aggregate model is trained using a list-wise approach in which a question Q is paired with a set of valid answers $A=\{A_1, \ldots, A_n\}$ and target label $y=\{y_1, \ldots, y_n\}$ to form a data point, and a training set comprising question-answer sets and corresponding labels are used to train the model using KL-divergence loss.

The conventional compare-aggregate model has two major limitations that are crucial in applying machine learning algorithms to real world systems. First, this technique focuses on training the model to perform on a particular target corpus, often resulting in over-fitting to the given target corpus. Second, the list-wise learning approach requires a list-wise corpus (e.g., multiple candidate answers to a single question) to train the model. Compiling such a corpus is practically infeasible to gather on a large scale. Further, questions that have large sets of valid answers result in large data points that are computationally expensive to apply, in operation and in training. As such, there is a need for improved techniques for computing similarity between units of textual information to support applications such as question answering.

Accordingly, embodiments of the present invention are directed to techniques for identifying textual similarity and performing answer selection using a pre-trained language model, condensed similarity information from latent clustering of a target corpus, transfer learning and/or point-wise learning. In some embodiments, a textual-similarity computing model can use a pre-trained language model to generate vector representations of a question and an answer. In order to enhance a textual comparison between a question and a candidate answer, latent clustering can be performed to compute topical or other categorical information from a target corpus, and that information can be used in computing textual similarity. More specifically, the target corpus can be clustered into a designated number of latent topics or other latent groupings. The topics and other groupings are latent because they are assumed to exist. Probabilities of a question or answer being in each of the latent topics and other latent groupings can be calculated, condensed to improve performance, and combined with a downstream vector representation of the question (or answer) in the textual-similarity computing model. As such, the model can use focused topical information as auxiliary information in a similarity computation. In training, transfer learning may be applied from a large-scale corpus, and the conventional list-wise approach can be replaced with point-wise learning. As such, the resulting textual-similarity computing model can perform answer selection from a target corpus with improved accuracy over prior techniques.

By way of background, it may be assumed that topical and other categorical information about a target corpus will help a neural network model to analyze the entire corpus. As such, the target corpus can be split into a desired set of candidate answers (e.g., sentences, phrases, paragraphs, sections, sub-divisions, etc.), the candidate answers can be encoded into corresponding vector representations, and the vector representations can be clustered into a designated number of latent memory vectors. Any suitable clustering technique may be applied. The latent memory vectors can be compared with a vector representation of a particular question or answer to determine a measure of similarity between each latent memory vector and the question or answer. The measure of similarity represents a measure of likelihood (e.g., probability) that the question or answer is in a corresponding latent topic or other latent grouping. For a given question or answer, the measures of similarity for the different latent groupings can be combined in a number of ways. For example, similarity information for the top latent groupings can be identified for a particular question or answer (e.g., a designated number of top latent topics/groupings, latent topics/groupings with measures above a designated threshold, etc.), similarity information for the other latent topics/groupings can be pruned, and similarity information for the top latent topics/groupings can be aggregated by weighted summing of the measures of similarity for the given question or answer to generate latent clustering information. The latent clustering information for a particular question (or answer) can be combined (e.g., concatenated) with a downstream vector representation of the question (or answer) in the textual-similarity computing model. As such, the textual-similarity computing model can use the latent clustering information as auxiliary information in computing textual similarity between a question and a candidate answer.

The textual-similarity computing model can be used to select an answer (or a top number of answers) from a set of candidate answers of a target corpus. For example, a query with a natural language question can be encoded, paired with each of a plurality of candidate answers from the target corpus, and fed into the textual-similarity computing model to compute a matching score for each question and answer pair. The candidate answer with the best matching score (or the candidate answers with the top scores) can be selected and presented as an answer(s) to the question. By optimizing the amount of latent clusters used to compute-textual similarity, the question answering task can be performed with improved accuracy over prior techniques.

Having briefly described an overview of aspects of the present invention, various terms used throughout this description are provided. Although more details regarding various terms are provided throughout this description, general descriptions of some terms are included below to provider a clearer understanding of the ideas disclosed herein:

As used herein, a corpus refers to a set of electronic text(s). A corpus can include any number of electronic texts in any suitable format. Some nonlimiting example of corpora include a collection of web pages, sections of a product manual, articles in a textual tutorial, a currently opened document, documents in a particular folder or cloud storage account, encyclopedia entries, and others. A target corpus is the set of electronic texts from which an answer is to be selected. In some cases, a target corpus can be thought of as a collection of texts to be searched for an answer. A corpus generally includes natural language text and may be split into one or more sets of candidate answers (e.g., sentences, phrases, paragraphs, sections, sub-divisions, some combination thereof, etc.).

As used herein, a question refers to a natural language query, and an answer refers to a natural language result. Generally, an answer may be identified as some portion of a text, such as a sentence, phrase, paragraph, section, sub-division, and/or the like.

Many natural language processing techniques operate by encoding a particular textual input (e.g., a sentence) into a fixed length vector. However, as the length of the textual input grows, this compression often leads to reduced performance. Attention is a technique that addresses this problem by generating a context vector that includes entries that compare (pay attention to) different portions of one or more embeddings (e.g., portions of question and answer). Attention can be thought of a technique for aligning embedding vectors (e.g., identifying relevant portions thereof) and translating the embedding vectors (e.g., using the relevant portions to generate an output).

As used herein, latent clustering refers to a technique in which a target corpus is clustered by topic or some other type of grouping. Latent topics and groupings are considered latent because they are assumed to exist. Generally, a target corpus can be split into a desired set of candidate answers (e.g., sentences, phrases, paragraphs, sections, sub-divisions, etc.). The candidate answers can be encoded into corresponding vector representations, and the vector representations can be clustered into a designated number of latent memory vectors. Any suitable clustering technique may be applied, such as k-means clustering, mean-shift clustering, spectral clustering, and agglomerative clustering, to name a few. The clusters may form topics, answer types (e.g., fact, explanation, description, etc.), or some other type of grouping.

As used herein, point-wise learning refers to a machine-learning training technique whereby training data points are formed by sampling from a list of valid inputs. By contrast, list-wise learning refers to a machine-learning training technique whereby training data points are formed with the entire list of known inputs. For example, in a list-wise learning approach, if a particular question Q has three valid answers $A_1$, $A_2$, and $A_3$, an input data point can be formed as [Q; $A_1$; $A_2$; $A_3$]. By contrast, under a point-wise learning regime, three point-wise samples can be formed as: [Q; $A_1$], [Q; $A_2$], [Q; $A_3$].

Example Automatic Answer Selection Environment

Referring now to FIG. 1, a block diagram of an example environment 100 suitable for use in implementing embodiments of the invention is shown. Generally, environment 100 is suitable for identifying textual similarity between units of textual information, and, among other things, facilitates automatic answer selection from a target corpus. Environment 100 includes client device 105, target corpus 150, and server 120 having answer selection component 130. Generally, a user may input a question as natural language query on target corpus 150 via an interface component of client device 105. The interface component can communicate the query to answer selection component 130, which can identify and provide a matching answer or answer from target corpus 150. Client device 105 and/or server 120 can be any kind of computing device capable of facilitating automatic answer selection. For example, in an embodiment, client device 105 and server 120 can be a computing device such as computing device 600, as described below with reference to FIG. 6. In embodiments, client device 105 and/or server 120 can be a personal computer (PC), a laptop computer, a workstation, a mobile computing device, a PDA, a cell phone, or the like. The components of environment 100 may communicate with each other via network 110, which may include, without limitation, one or more local area networks (LANs) and/or wide area networks (WANs). Such networking environments are commonplace in offices, enterprise-wide computer networks, intranets, and the Internet.

In the embodiment illustrated in FIG. 1, client device 105 includes an interface component, and server 120 includes answer selection component 130. Either or both of these components, or some portion thereof, may be incorporated or integrated into an application or an add-on or plug-in to an application. The application may generally be any application capable of facilitating identification of textual similarity between units of textual information and/or automatic answer selection. The application may be a stand-alone application, a mobile application, a web application, or the like. In some implementations, the application(s) comprises a web application, which can run in a web browser, and could be hosted at least partially server-side. In addition, or instead, the application(s) can comprise a dedicated application. In some cases, the application can be integrated into the operating system (e.g., as a service). Additionally or alternatively to integrating the components into an application, the interface component of client device 105 and/or answer selection component 130 of server 120, or some portion thereof, can be integrated into an operating system (e.g., as a service). Although these components are depicted as residing on separate machines, this need not be the case, as any suitable configuration may be implemented.

In the embodiment illustrated in FIG. 1, answer selection component 130 includes compare-aggregate model 135 and latent clustering component 140. At a high level, compare-aggregate model 135 identifies a matching score between a question and a candidate answer from target corpus 150. To accomplish this, latent clustering component 140 compares the question and/or candidate answer to a designated number of latent topics or other latent groupings to generate latent clustering information, and compare-aggregate model 135 uses the latent clustering information to compute a matching score quantifying a measure of similarity between a question and answer pair. Answer selection component 130 can use these components to compute matching scores for a plurality of candidate answers in target corpus 150 and identify the top one or more candidate answers for presentation. The top answer(s) can be provided or otherwise identified for presentation on client device 105.

Figure 2:
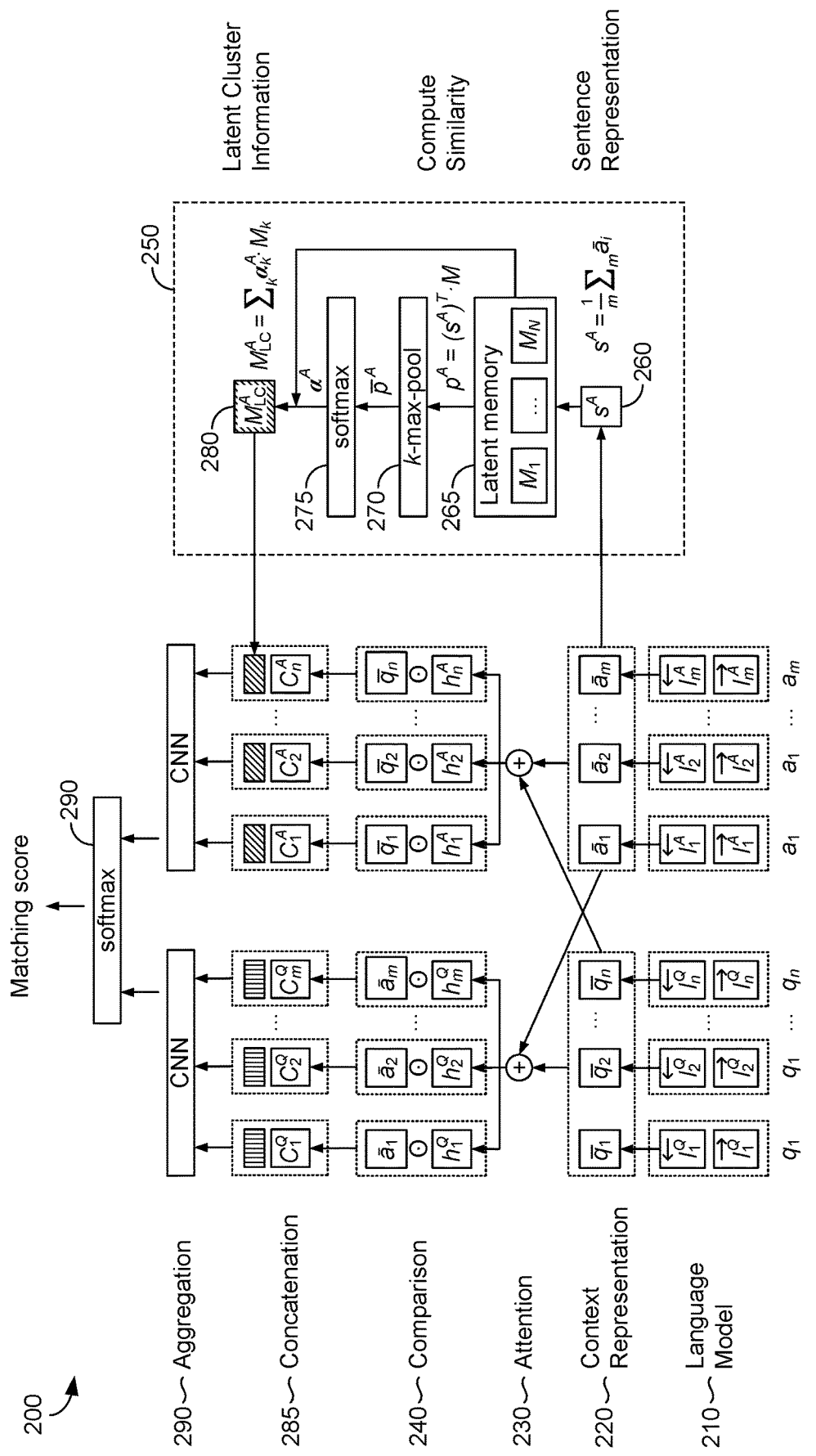
FIG. 2 illustrates an example architecture for an answer selection component, in accordance with certain embodiments.

FIG. 2 illustrates an example architecture for an answer selection component 200, in accordance with embodiments of the present invention. Answer selection component 200 may correspond to answer selection component 130 of FIG. 1. Generally, answer selection component 130 accepts as inputs a question Q={$q_1$, . . . , $q_n$} and candidate answer A={$a_1$, . . . , $a_n$} and outputs a matching score. The general flow of information in FIG. 2 is from bottom to top. In this embodiment, answer selection component 200 includes a language model 210 which generates embedding vectors for the question and candidate answer, which are processed to capture context representation 220 (e.g., separate representations for the question and answer, a combined representation). Attention mechanism 230 aligns and translates context representation(s) 220 to generate an attention-applied context representation (e.g., separate representations for the question and answer, a combined representation), and comparison 240 matches words (or some other sub-division) in the context representation 220 to the corresponding attention-applied vector representation to generate a matched representation (e.g., separate representations for the question and answer, a combined representation). In the embodiment illustrated in FIG. 2, latent cluster component 250 (which may correspond to latent clustering component 140 of FIG. 1) compares the candidate answer to a designated number of latent memory vectors (e.g., latent topic vectors) clustered from a target corpus to generate latent clustering information, and the latent clustering information is concatenated 285 with the matched representation for the answer. Although FIG. 2 only depicts latent clustering of the answer, it may additionally or alternatively be performed on the question, and latent clustering information for the question may be concatenated 285 with the matched representation for the question. The matched representations with latent clustering information can be aggregated 290 and optionally normalized 295 to generate a matching score quantifying textual similarity between the question and candidate answer.

Generally, language model 210 generates embedding vectors from a particular natural language question $Q \in \mathbb{R}^{d \times Q}$ and answer $A \in \mathbb{R}^{d \times A}$ where d is a dimensionality of embedding and Q and A are lengths of the sequence in Q and A, respectively. The sequence in Q and/or A may comprise units of any suitable sub-division of text (e.g., phoneme, word, phrase, sentence, etc.), and language model 210 may be configured to generate an embedding vector for each of a plurality of sub-divisions (e.g., phoneme, word, sentence, paragraph, some other suitable sub-division, some combination thereof, etc.). In some embodiments, language model 210 may be a pre-trained language model. Using a pre-trained language model can help capture the contextual meaning of the sub-division of the textual input. The embedding vectors for the question and candidate answer can be designated as $L^Q$ and $L^A$, respectively.

The embedding vectors can be processed to generate context representation(s) 220, which encode contextual information for a particular question and candidate answer. For example, embedding vectors $L^Q$ and $L^A$ may be processed to capture contextual information within the sentence as follows:

$$\overline{Q} = \sigma(W^iL^Q) \odot \tan h(W^uL^Q) \quad (1)$$

$$\overline{A} = \sigma(W^iL^A) \odot \tan h(W^uL^A) \quad (2)$$

where $\odot$ denotes elementwise multiplication, $\sigma$ is the sigmoid function, and $W \in \mathbb{R}^{l \times d}$ is a learned model parameter. This technique is simply an example, and any other technique for encoding contextual information from a question and candidate answer may be implemented within the scope of the present disclosure.

Attention mechanism 230 may calculate the soft alignment of each element in $\overline{Q} \in \mathbb{R}^{l \times Q}$ and $\overline{A} \in \mathbb{R}^{l \times A}$ using dynamic-clip attention to obtain attention-applied context representations $H^Q \in \mathbb{R}^{l \times A}$ and $H^A \in \mathbb{R}^{l \times Q}$, respectively.

$$H^Q = \overline{Q} \cdot \text{softmax}((W^q\overline{Q})^T\overline{A}) \quad (3)$$

$$H^A = \overline{A} \cdot \text{softmax}((W^a\overline{A})^T\overline{Q}) \quad (4)$$

A comparison function 240 may be utilized to match each sub-division (e.g., word) in a representation of the question and candidate answer (e.g., content representation 220) to the corresponding attention-applied context representations $H^Q$ and $H^A$. For example, element-wise multiplication may be applied to generate matched representations $C^Q \in \mathbb{R}^{l \times A}$ and $C^A \in \mathbb{R}^{l \times Q}$.

$$C^Q = \overline{A} \odot H^Q \quad (5)$$

$$C^A = \overline{Q} \odot H^A \quad (6)$$

Generally, extracting latent clustering information of a target corpus and using it as auxiliary information in determining textual similarity may help answer selection component 200 to analyze the target corpus. As such, the target corpus may be clustered into latent topics and/or other latent groupings (whether in advance, on demand, or otherwise) to generate latent memory vectors $M_{1:N}$, and latent cluster component 250 may calculate a measure of similarity between a representation of a question (or candidate answer) for each latent memory vector. The measure of similarity represents a measure of likelihood that the question (or candidate answer) falls within a corresponding latent topic or other latent grouping. For a given question (or candidate answer), the measure of similarity between the question (or candidate answer) and each latent memory vector can be combined in a number of ways. For example, the top latent topics/groupings can be identified for a particular question or candidate answer (e.g., a designated number of top latent topics/groupings, latent topics/groupings with measures above a designated threshold, etc.), and the top latent topics/groupings can be aggregated by weighted summing of the measures of similarity for the given question (or answer) to generate latent clustering information.

More specifically, in the embodiment illustrated in FIG. 2, latent cluster component 250 may form a representation of context representation 220 for a candidate answer. Generally, context representation 220 for a question (or candidate answer) may include a plurality of vectors corresponding to sub-divisions of the question (or candidate answer), such as a phoneme, word, or phrase. In some embodiments, latent cluster component 250 may consolidate context representation 220 to form a larger unit of text, such as a sentence, paragraph, section, or other unit. In the embodiment illustrated in FIG. 2, latent cluster component 250 forms sentence representation 260 from the context representation 220 of a candidate answer. One example way to consolidate multiple vectors of context representation 220 is averaging:

$$s^A = \frac{1}{m} \sum_m \overline{a}_i \quad (7)$$

Additionally or alternatively to consolidating the entire context representation 220 for a particular candidate answer, in some embodiments, one or more of a plurality of vectors of context representation 220 may be used in lieu of sentence representation 260 (e.g., the last vector in context representation 220, consolidating a set of vectors of context representation 220, passing separate vectors through parallel paths or some other path, etc.). These configurations are meant simply as examples, and other variations may be implemented within the scope of the present disclosure.

Latent memory 265 may be formed by clustering a target corpus. Generally, it may be assumed that topical information about a target corpus will help a neural network model to analyze the entire corpus. As such, the target corpus can be split into a desired set of candidate answers (e.g., sentences, phrases, paragraphs, sections, sub-divisions, etc.), the candidate answers can be encoded into corresponding vector representations, and the vector representations can be clustered into a designated number of latent memory vectors. Any suitable clustering technique may be applied. As such, the target corpus may be clustered into latent topics or other latent groupings (whether in advance, on demand, or otherwise) to generate latent memory vectors $M_{1:N}$, which may be stored in latent memory 265. Any suitable number N of latent clusters may be selected. In some implementations, the selection of the number of latent clusters (e.g., 3) can positively impact the accuracy of the question answering task.

Continuing with the example of FIG. 2, sentence representation 260 (or some other representation of a candidate answer) may be compared with each of the latent memory vectors $M_{1:N}$ to determine a measure of similarity between each latent memory vector and the candidate answer. The measure of similarity may represent a measure of likelihood (e.g., probability) that the candidate answer is in a corresponding latent topic. In the embodiment illustrated in FIG. 2, this comparison can be represented as:

$$P_{1:N} = s^T M_{1:N} \quad (8)$$

The measures of similarity for the different latent topics/groupings (e.g., probabilities that the candidate answer is in the different latent topics or other latent groupings) can be combined in a number of ways. For example, the top latent topics/groupings can be identified for the candidate answer (e.g., a designated number of top latent topics/groupings, latent topics/groupings with measures above a designated threshold, etc.), similarity information for the remaining latent topics/groupings can be pruned, and similarity information for the top latent topics/groupings can be aggregated by weighted summing. Generally, carrying information about these less relevant topics through the network is wasteful and negatively impacts performance. In other words, it makes sense to focus on the most relevant topic(s)

(e.g., sports), so latent clustering may be performed on a target corpus to facilitate quantifying the extent to which each candidate answer is about each topic. Similarity information for less relevant topics may be dropped (e.g., by downsampling) to improve performance. In the embodiment illustrated in FIG. 2, this is accomplished by k-max-pooling 270. In some embodiments, the number of latent clusters N and/or the number of top clusters k for which to carry information forward may be pre-determined, user-selectable, or otherwise. The remaining similarity information may be normalized (e.g., by using a softmax function 275). Latent cluster information 280 for the candidate answer may be formed by consolidating the remaining (normalized) similarity information $\alpha^A$, for example, by summing the (normalized) similarity information $\alpha^A$, weighted by a corresponding latent memory vector. In the example illustrated in FIG. 2, this can be represented as:

$$M_{LC}^A = \Sigma_k \alpha_k^A \cdot M_k \qquad (9)$$

Although in FIG. 2, latent cluster information 280 is only depicted as being generated for a candidate answer, latent clustering information may additionally or alternatively be generated for a question.

The latent clustering information for a question and candidate answer can be combined with corresponding matched representations $C^Q$ and $C^A$ in any suitable way, such as by concatenation 285. In the embodiment illustrated in FIG. 2, latent clustering information 280 is concatenated with each element of $C^A$ (illustrated in FIG. 2 with diagonal stripes). The matched representations with latent clustering information can be aggregated 290, for example, using a convolutional neural network with a designated number of filters for each path. The aggregated outputs for the question and candidate answer $R^Q$ and $R^A$ may be used to calculate a matching score between Q and A. For example, a matching score can be computed as $\sigma([R^Q; R^A]^T W)$, where [;] denotes a concatenation of each vector $R^Q \in \mathbb{R}^{nl}$ $R^A \in \mathbb{R}^{nl}$, and $W \in \mathbb{R}^{nl}$ is a learned model parameter. In some embodiments, the matching score can be normalized, for example, by using a softmax function 290. As such, answer selection component 200 may compute a matching score between a particular question and candidate answer.

Regarding training, generally any suitable training technique may be used. By way of nonlimiting example, in some embodiments, internal parameters of a textual-similarity computing model such as answer selection component 200 may be learned by applying transfer learning using a desired corpus of training data. More specifically, data from a relatively large corpus may initially be used for training, and fine-tuning may be performed using a target corpus. Additionally or alternatively, a point-wise learning approach may be implemented. Generally, labels may indicate whether a particular question and candidate answer are correctly paired (e.g., a binary label). Each candidate answer in a particular training dataset may be paired with the question, fed into the model, and results may be compared with the labels using cross-entropy loss to train the model as follows:

$$\text{loss} = -\Sigma_{n=1}^{N} y_n \log(\text{score}_n) \qquad (10)$$

In equation 10, N is the total number of samples used in training. Using a point-wise learning approach, the number of data points and training instances increases over the list-wise approach.

Figure 3:
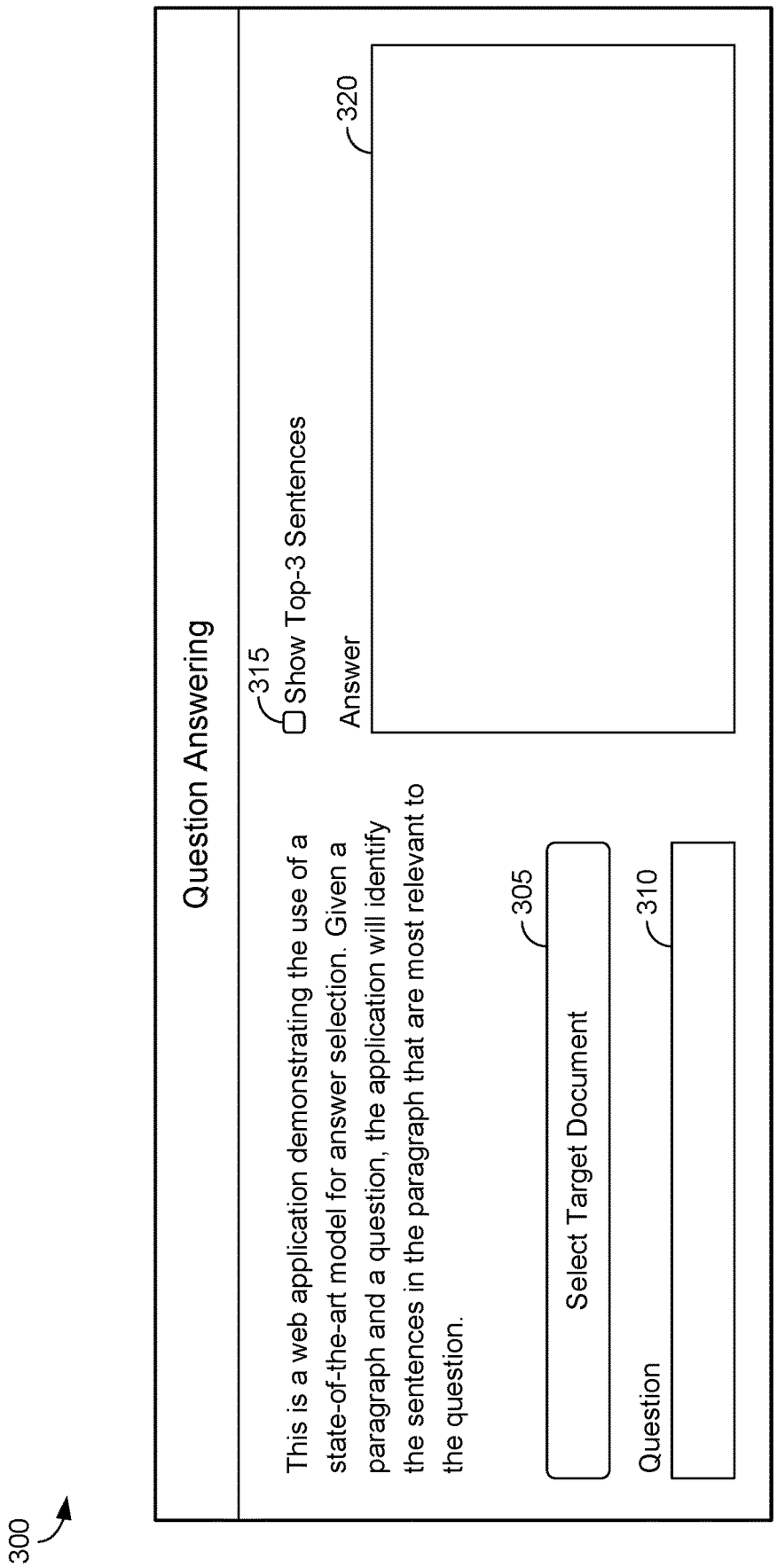
FIG. 3 illustrates an example user interface for question answering, in accordance with certain embodiments.

FIG. 3 illustrates an example user interface 300 for question answering, in accordance with certain embodiments of the present invention. User interface 300 may run in an application such as a web browser on a client device, such as client device 105 of FIG. 1. In the example illustrated in FIG. 3, user interface includes button 305 enables a user to identify a target document (or target corpus). Selection of button 305 may enable an upload or identification of a target document (or target corpus). Some non-limiting examples of document formats include PDF, HTML, DOC, DOCX, XLM, RTF, TeX, TEI, ASCII, and UTF-8, to name a few. Question field 310 can accept a natural language textual input. Although user interface 310 illustrates a textual input field, any suitable input may be accepted, such as programmatic, gesture, voice, haptic, and others. As a user enters a question, the candidate answers from the selected target document can be evaluated for textual similarity with the question, and the top answer can be presented or otherwise identified in answer field 320. In some embodiments, answer field 320 can present an adjacent or surrounding excerpt of the selected target document (or corpus) with the selected answer indicated (e.g., highlighted, underlined, italicized, bolded, some other indication, etc.). Check box 315 (or some other selectable interaction element) may enable a selection of a designated number of top answers (e.g., sentences) to be presented in field 320. In this example, the top answers may be presented with corresponding adjusted or surrounding excerpt(s) of the selected target document.

Additionally or alternatively to presenting or otherwise identifying the top answer(s), in some embodiments, user interface 300 may present corresponding similarity information (e.g., probability) for each of the latent topics or other latent groupings and/or corresponding labels for the topics/groupings. To identify labels for the topics, a set of test samples can be selected from a training dataset and applied to the model to identify which sample belongs to which latent topic or grouping. The latent topics and other latent groupings can be identified by evaluating the known samples, and the identified topics can be used as annotations. Thus, when an answer is selected in operation for a question, a corresponding label for a corresponding topic or grouping may be looked up and presented. The topic and/or similarity information may be presented upon presenting the answer, upon selection or interaction with an interaction element of user interface 300 (e.g., hovering over the answer), or otherwise. User interface 300 is meant simply as an example, and other variations may be implemented with the scope of the present disclosure.

Exemplary Flow Diagrams

Figure 4:
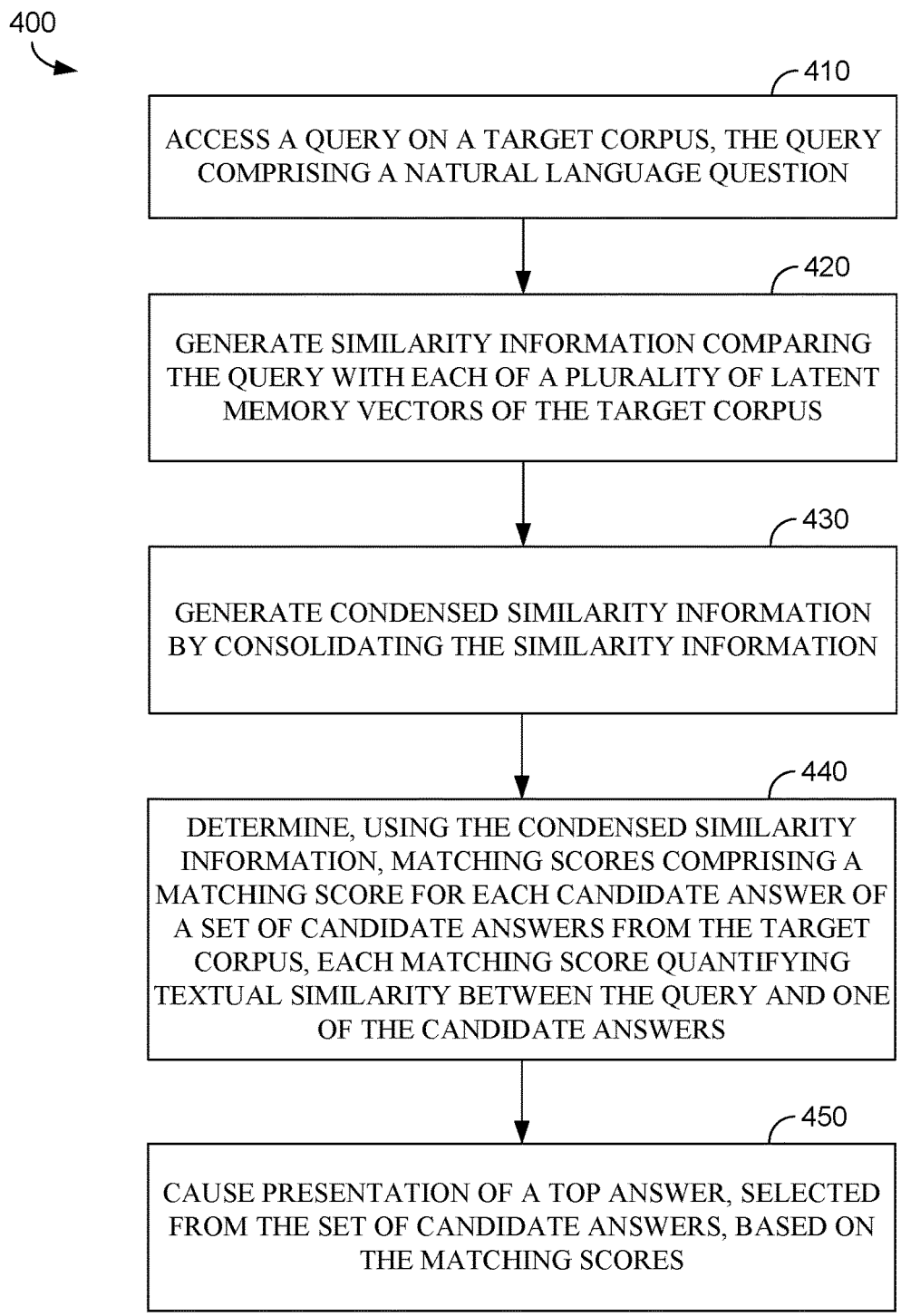
FIG. 4 is a flow diagram showing a method for automatic answer selection, in accordance with certain embodiments.
Figure 5:
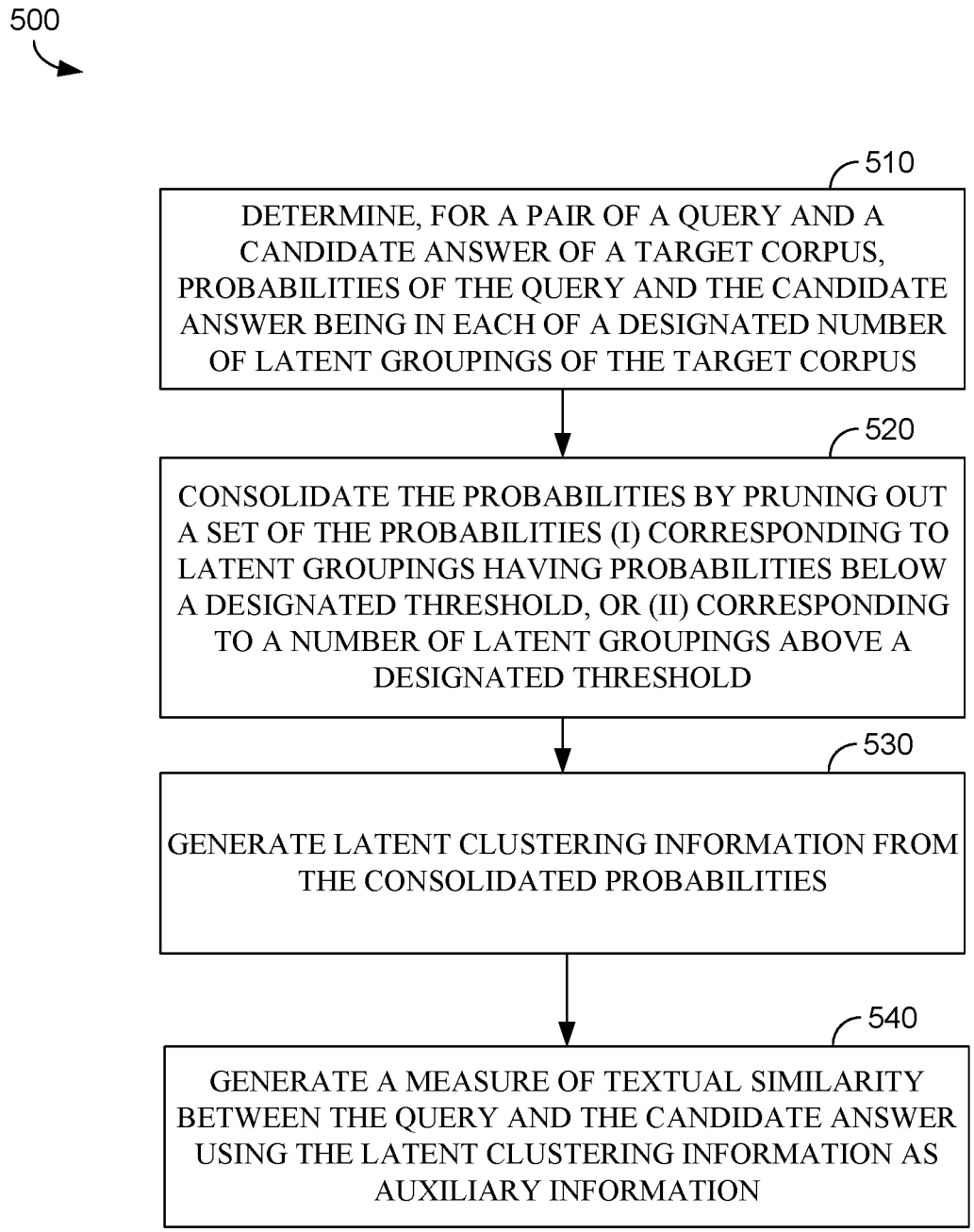
FIG. 5 is a flow diagram showing a method for identifying textual similarity, in accordance with certain embodiments.

With reference now to FIGS. 4-5, flow diagrams are provided illustrating methods for answer selection. Each block of the methods 400 and 500 and any other methods described herein comprise a computing process performed using any combination of hardware, firmware, and/or software. For instance, various functions can be carried out by a processor executing instructions stored in memory. The methods can also be embodied as computer-usable instructions stored on computer storage media. The methods can be provided by a standalone application, a service or hosted service (standalone or in combination with another hosted service), or a plug-in to another product, to name a few.

Turning initially to FIG. 4, FIG. 4 illustrates a method 400 for automatic answer selection, in accordance with embodiments described herein. Initially at block 410, a query on a target corpus is accessed. The query comprises a natural language question, and the target corpus is the set of electronic text(s) from which an answer is to be selected. At block 420, similarity information comparing the query with each of a plurality of latent memory vectors of the target corpus is generated. For example, for each question and latent grouping (e.g., latent topic) pair, a probability can be determined that the question is in the latent grouping. At block 430, condensed similarity information is generated by consolidating the similarity information. For example, max pooling can be used to downsample the similarity information to effectively focus on similarity information for the most relevant latent groupings. At block 440, matching scores are determined using the condensed similarity information. A matching score for each candidate answer of a set of candidate answers from the target corpus is calculated. Each matching score quantifies textual similarity between the query and one of the candidate answers. At block 450, presentation of a top answer is caused. The top answer is selected from the set of candidate answers based on the matching scores (e.g., the candidate answer having the highest matching score).

Turning now to FIG. 5, FIG. 5 illustrates a method 500 for identifying textual similarity, in accordance with embodiments described herein. Initially at block 510, probabilities of a query and a candidate answer being in each of a designated number of latent groupings of the target corpus are determined. The candidate answer is part of a target corpus. At block 520, the probabilities are consolidated by pruning out a set of the probabilities (i) corresponding to latent groupings having probabilities below a designated threshold, or (ii) corresponding to a number of latent groupings above a designated threshold. For example, max pooling can be used to downsample the probabilities to effectively focus on probabilities for the most relevant latent groupings. At block 530, latent clustering information is generated from the consolidated probabilities. For example, the consolidated probabilities can be summed, weighted by a representation of a corresponding latent grouping (e.g., latent memory vector) for each probability. At block 540, a measure of textual similarity is generated between the query and the candidate answer using the latent clustering information as auxiliary information. The measure of textual similarity for the candidate answer may be used to select an answer to the query.

Exemplary Operating Environment

Figure 6:
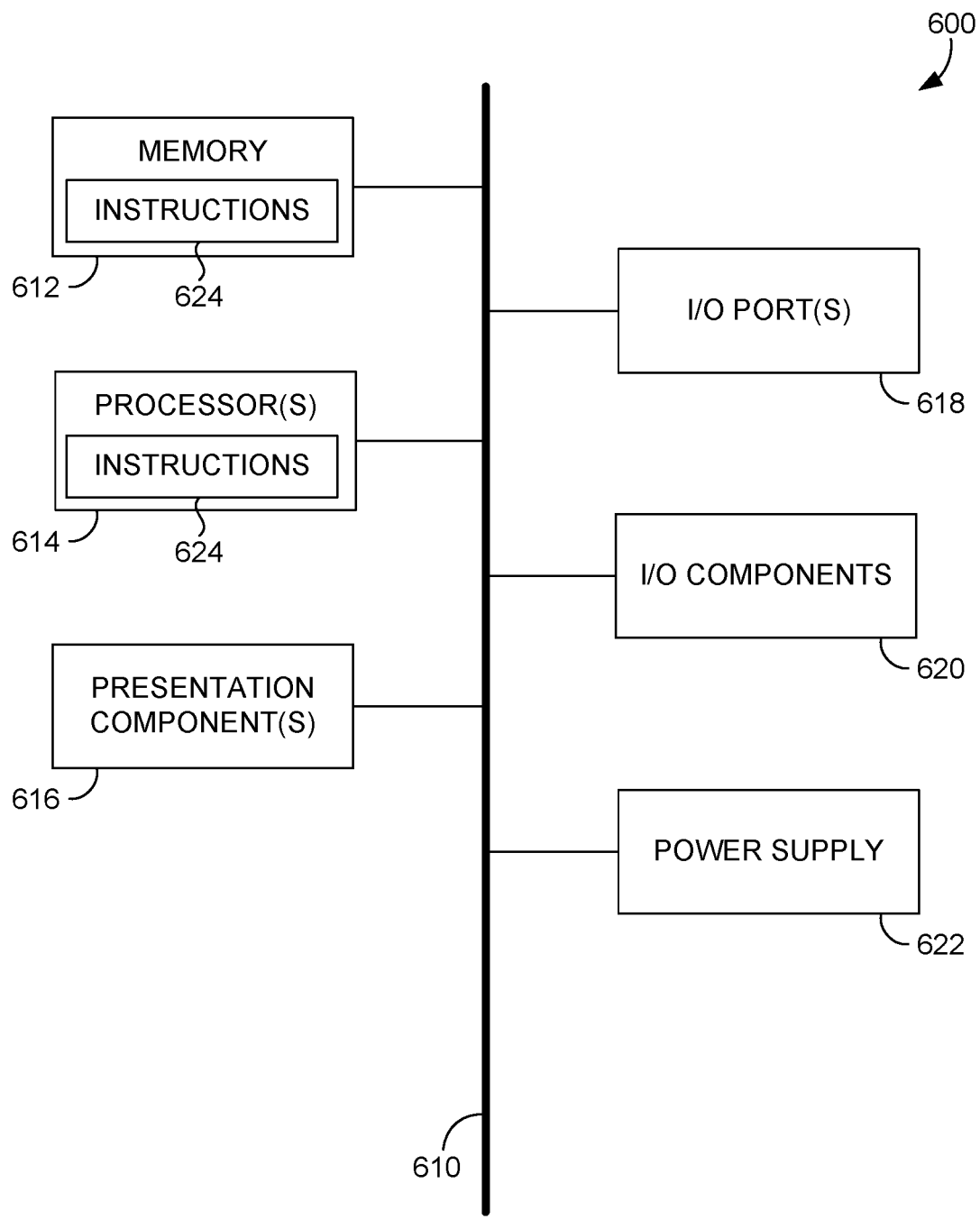
FIG. 6 is a block diagram of an exemplary computing environment suitable for use in implementing certain embodiments.

Having described an overview of embodiments of the present invention, an exemplary operating environment in which embodiments of the present invention may be implemented is described below in order to provide a general context for various aspects of the present invention. Referring now to FIG. 6 in particular, an exemplary operating environment for implementing embodiments of the present invention is shown and designated generally as computing device 600. Computing device 600 is but one example of a suitable computing environment and is not intended to suggest any limitation as to the scope of use or functionality of the invention. Neither should computing device 600 be interpreted as having any dependency or requirement relating to any one or combination of components illustrated.

The invention may be described in the general context of computer code or machine-useable instructions, including computer-executable instructions such as program modules, being executed by a computer or other machine, such as a cellular telephone, personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 6, computing device 600 includes bus 610 that directly or indirectly couples the following devices: memory 612, one or more processors 614, one or more presentation components 616, input/output (I/O) ports 618, input/output components 620, and illustrative power supply 622. Bus 610 represents what may be one or more busses (such as an address bus, data bus, or combination thereof). Although the various blocks of FIG. 6 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventor recognizes that such is the nature of the art, and reiterates that the diagram of FIG. 6 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 6 and reference to "computing device."

Computing device 600 typically includes a variety of computer-readable media. Computer-readable media can be any available media that can be accessed by computing device 600 and includes both volatile and nonvolatile media, and removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 600. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 612 includes computer-storage media in the form of volatile and/or nonvolatile memory. The memory may be removable, non-removable, or a combination thereof. Exemplary hardware devices include solid-state memory, hard drives, optical-disc drives, etc. Computing device 600 includes one or more processors that read data from various entities such as memory 612 or I/O components 620. Presentation component(s) 616 present data indications to a user or other device. Exemplary presentation components include a display device, speaker, printing component, vibrating component, etc.

I/O ports 618 allow computing device 600 to be logically coupled to other devices including I/O components 620, some of which may be built in. Illustrative components include a microphone, joystick, game pad, satellite dish, scanner, printer, wireless device, etc. The I/O components 620 may provide a natural user interface (NUI) that processes air gestures, voice, or other physiological inputs generated by a user. In some instances, inputs may be transmitted to an appropriate network element for further processing. An NUI may implement any combination of speech recognition, stylus recognition, facial recognition, biometric recognition, gesture recognition both on screen and adjacent to the screen, air gestures, head and eye tracking, and touch recognition (as described in more detail below) associated with a display of computing device 600. Computing device 600 may be equipped with depth cameras, such as stereoscopic camera systems, infrared camera systems, RGB camera systems, touchscreen technology, and combinations of these, for gesture detection and recognition. Additionally, the computing device 600 may be equipped with accelerometers or gyroscopes that enable detection of motion. The output of the accelerometers or gyroscopes may be provided to the display of computing device 600 to render immersive augmented reality or virtual reality.

Embodiments described herein support automatic answer selection. The components described herein refer to integrated components of an automatic answer selection system. The integrated components refer to the hardware architecture and software framework that support functionality using the system. The hardware architecture refers to physical components and interrelationships thereof and the software framework refers to software providing functionality that can be implemented with hardware embodied on a device.

The end-to-end software-based system can operate within the system components to operate computer hardware to provide system functionality. At a low level, hardware processors execute instructions selected from a machine language (also referred to as machine code or native) instruction set for a given processor. The processor recognizes the native instructions and performs corresponding low level functions relating, for example, to logic, control and memory operations. Low level software written in machine code can provide more complex functionality to higher levels of software. As used herein, computer-executable instructions includes any software, including low level software written in machine code, higher level software such as application software and any combination thereof. In this regard, the system components can manage resources and provide services for the system functionality. Any other variations and combinations thereof are contemplated with embodiments of the present invention.

Having identified various components in the present disclosure, it should be understood that any number of components and arrangements may be employed to achieve the desired functionality within the scope of the present disclosure. For example, the components in the embodiments depicted in the figures are shown with lines for the sake of conceptual clarity. Other arrangements of these and other components may also be implemented. For example, although some components are depicted as single components, many of the elements described herein may be implemented as discrete or distributed components or in conjunction with other components, and in any suitable combination and location. Some elements may be omitted altogether. Moreover, various functions described herein as being performed by one or more entities may be carried out by hardware, firmware, and/or software, as described below. For instance, various functions may be carried out by a processor executing instructions stored in memory. As such, other arrangements and elements (e.g., machines, interfaces, functions, orders, and groupings of functions, etc.) can be used in addition to or instead of those shown.

The subject matter of the present invention is described with specificity herein to meet statutory requirements. However, the description itself is not intended to limit the scope of this patent. Rather, the inventor has contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. One or more computer storage media storing computer-useable instructions that, when used by one or more computing devices, cause the one or more computing devices to perform operations comprising:
   accessing a query on a target corpus, the query comprising a natural language question, the target corpus comprising candidate answers to the question;
   generating similarity information representing a likelihood that the question is in each of a plurality of latent groupings of the target corpus by comparing the query with corresponding latent memory vectors representing the latent groupings;
   generating condensed similarity information for top latent groupings of the latent groupings by consolidating the similarity information;
   determining, using the condensed similarity information for the top latent groupings, matching scores comprising a matching score for each of the candidate answers, each matching score quantifying textual similarity between the query and one of the candidate answers; and
   causing presentation of a top answer to the question, selected from the candidate answers, based on the matching scores.

2. The one or more computer storage media of claim 1, the operations further comprising using a pre-trained language model to generate a vector representation of the query, wherein generating the similarity information comprises comparing the vector representation of the query with each of the corresponding latent memory vectors.

3. The one or more computer storage media of claim 1, wherein generating the condensed similarity information comprises using max pooling to downsample the similarity information.

4. The one or more computer storage media of claim 1, the operations further comprising aggregating the condensed similarity information weighted by the latent memory vectors to generate latent clustering information, wherein calculating the matching scores is based on the latent clustering information.

5. The one or more computer storage media of claim 1, wherein determining the matching scores comprises operating a textual-similarity computing model trained using transfer learning from a second corpus, distinct from the target corpus, to predict the matching scores.

6. The one or more computer storage media of claim 1, wherein determining the matching scores comprises operating a textual-similarity computing model trained using point-wise learning with training data points formed by pairing a question with an answer sampled from a list of valid answers.

7. The one or more computer storage media of claim 1, the operations further comprising forming the latent memory vectors by clustering the target corpus.

8. A computerized method comprising:
   determining, for a pair of a query and a candidate answer of a target corpus, probabilities of the query and the candidate answer being in each of a plurality of latent groupings of the target corpus;
   consolidating the probabilities by pruning out a set of the probabilities (i) corresponding to a set of the latent groupings having values of the probabilities below a designated threshold, or (ii) corresponding to a number of the latent groupings above a designated threshold;
   generating latent clustering information from the consolidated probabilities; and
   generating a measure of textual similarity between the query and the candidate answer using the latent clustering information as auxiliary information.

9. The computerized method of claim 8, further comprising using a pre-trained language model to generate vector representations of the query and the candidate answer, wherein determining the probabilities of the query and the candidate answer being in each of the plurality of latent groupings is based on the vector representations.

10. The computerized method of claim 8, wherein pruning out the set of the probabilities comprises using max pooling to downsample the probabilities.

11. The computerized method of claim 8, wherein generating the latent clustering information comprises aggregating the consolidated probabilities weighted by a representation of the latent groupings.

12. The computerized method of claim 8, wherein generating the measure of textual similarity comprises operating a textual-similarity computing model trained using transfer learning from a second corpus, distinct from the target corpus, to predict the measure of textual similarity using the latent clustering information as auxiliary information.

13. The computerized method of claim 8, wherein generating the measure of textual similarity comprises operating a textual-similarity computing model trained using point-wise learning with training data points formed by pairing a question with an answer sampled from a list of valid answers.

14. The computerized method of claim 8, further comprising forming the latent groupings by clustering the target corpus to generate corresponding latent memory vectors representing the latent groupings.

15. A computer system comprising at least one processor and memory comprising:
   a set of latent memory vectors representing latent clusters of a set of candidate answers of a target document;
   a textual-similarity computing model; and
   an answer selection component configured to select, from the set of candidate answers of the target document, an answer to a question using the textual-similarity computing model, the answer selection component comprising:
      a first latent cluster component configured to generate a first measure of similarity between the question and the set of latent memory vectors by dropping similarity information for latent clusters beyond a threshold of similarity to the question; and
      a second latent cluster component configured to generate a second measure of similarity between the candidate answer and the set of latent memory vectors by dropping similarity information for latent clusters beyond a threshold of similarity to the answer;
   wherein the textual-similarity computing model is configured to compute textual similarity based on the first and second measures of similarity.

16. The computer system of claim 15, wherein the textual-similarity computing model comprises a pre-trained language model configured to generate a vector representation of at least one of the question or the answer.

17. The computer system of claim 15, wherein at least one of the first or second latent cluster component is configured to drop the first or the second similarity information using max pooling.

18. The computer system of claim 15, wherein at least one of the first or the second latent cluster component is configured to generate the first or the second measure of similarity by aggregating condensed similarity information weighted by the set of latent memory vectors.

19. The computer system of claim 15, the textual-similarity computing model trained using transfer learning from a second corpus, distinct from the target corpus, to predict the textual similarity.

20. The computer system of claim 15, the textual-similarity computing model trained using point-wise learning with training data points formed by pairing a particular question with an answer sampled from a list of valid answers.

* * * * *